(12) United States Patent
Takemoto

(10) Patent No.: US 6,407,881 B1
(45) Date of Patent: Jun. 18, 2002

(54) DISK APPARATUS HAVING A SHOCK ABSORBING MEMBER FOR A READ/WRITE HEAD

(75) Inventor: Takashi Takemoto, Sagamihara (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/428,106

(22) Filed: Oct. 27, 1999

(30) Foreign Application Priority Data

| Oct. 29, 1908 | (JP) | ............................................. | 10-309095 |
| Oct. 29, 1998 | (JP) | ............................................. | 10-309093 |
| Oct. 29, 1998 | (JP) | ............................................. | 10-309094 |
| Oct. 29, 1998 | (JP) | ............................................. | 10-309096 |
| Oct. 29, 1998 | (JP) | ............................................. | 10-309097 |

(51) Int. Cl.$^7$ .............................. G11B 5/54; G11B 33/14
(52) U.S. Cl. .................................. 360/99.06; 360/97.04; 360/255.2
(58) Field of Search ............................ 360/99.02, 99.03, 360/99.06, 99.07, 255.2–255.6

(56) References Cited

U.S. PATENT DOCUMENTS

| 4,280,156 A | * | 7/1981 | Villette | ...................... | 360/255.6 |
| 5,552,948 A | * | 9/1996 | Yokota et al. | ............ | 360/254.1 |
| 5,841,752 A | * | 11/1998 | Ohmori et al. | ............ | 369/75.2 |
| 5,859,750 A | * | 1/1999 | Nakai | ....................... | 360/255.5 |
| 5,943,193 A | * | 8/1999 | Thayne et al. | ............ | 360/255.5 |
| 6,091,586 A | * | 7/2000 | Shigemoto | ................ | 360/254.1 |
| 6,151,190 A | * | 11/2000 | Yamamoto et al. | ....... | 360/99.06 |

* cited by examiner

Primary Examiner—Jefferson Evans
(74) Attorney, Agent, or Firm—Anderson Kill & Olick; Eugene Lieberstein; Michael Meller

(57) ABSTRACT

A disk apparatus includes a disk loading device which loads a disk from an insert/eject position to a read/write position, the disk having a first surface and a second surface. A head device records information to and/or reproduces information from the disk at the read/write position, the head device configured as a pair of upper and lower heads which are brought into contact with the first and second surfaces of the disk when the disk is loaded to the read/write position. A shock absorbing member is movably arranged on the disk loading device and has a shock absorbing effect on the upper and lower heads of the head device. The shock absorbing member is maintained at an active position between the upper head and the lower head when the disk is at the insert/eject position. When the disk is loaded to the read/write position, the shock absorbing member is transferred from the active position into an inactive position where the shock absorbing member does not interfere with the head device.

10 Claims, 8 Drawing Sheets

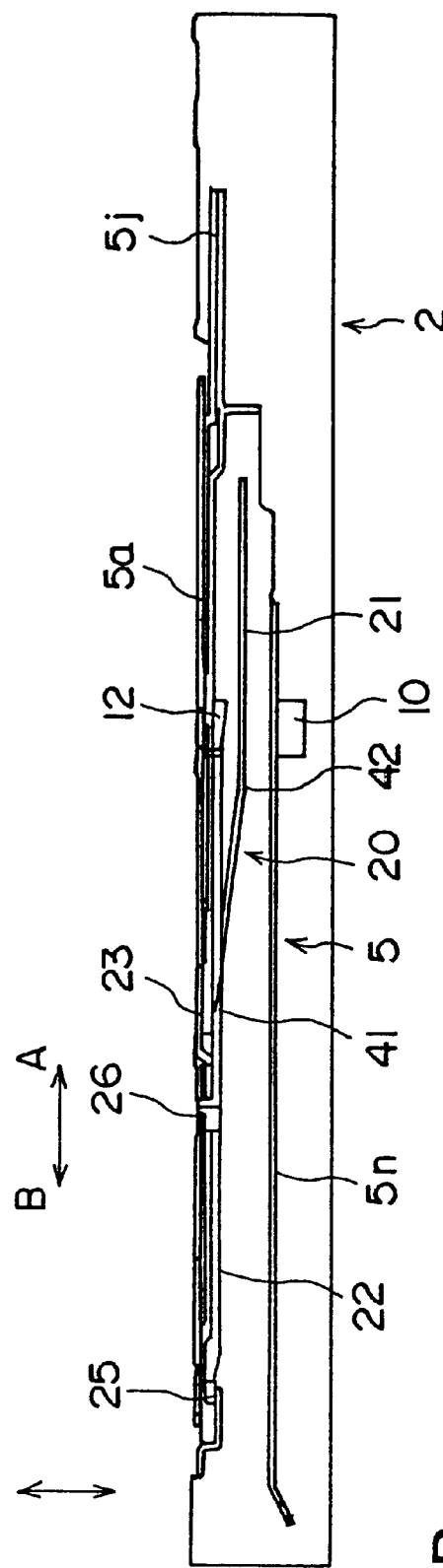
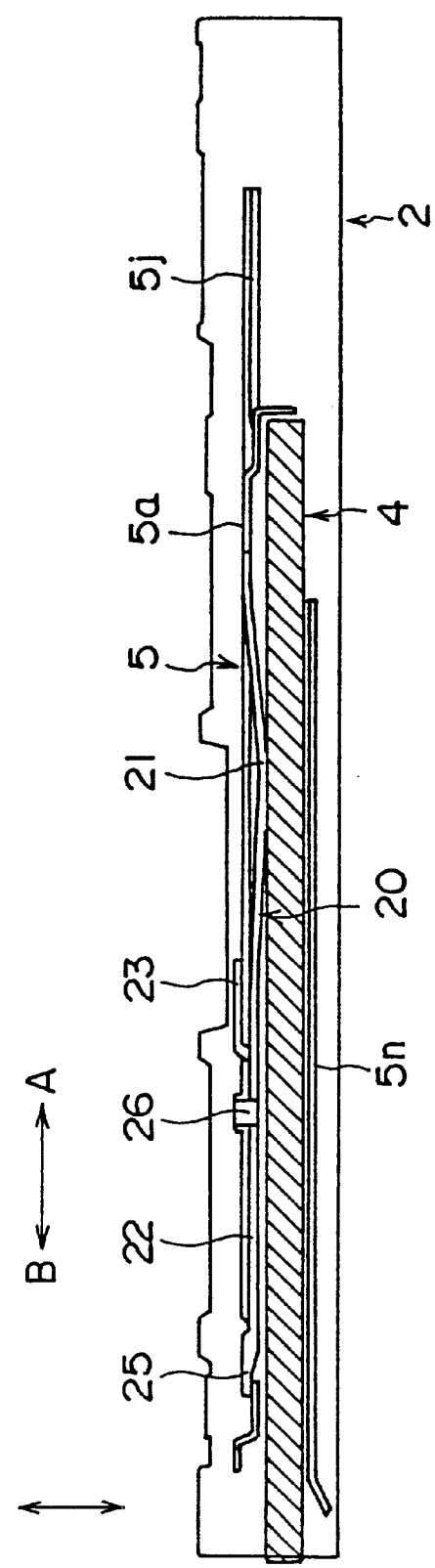
FIG.4A
FIG.4B

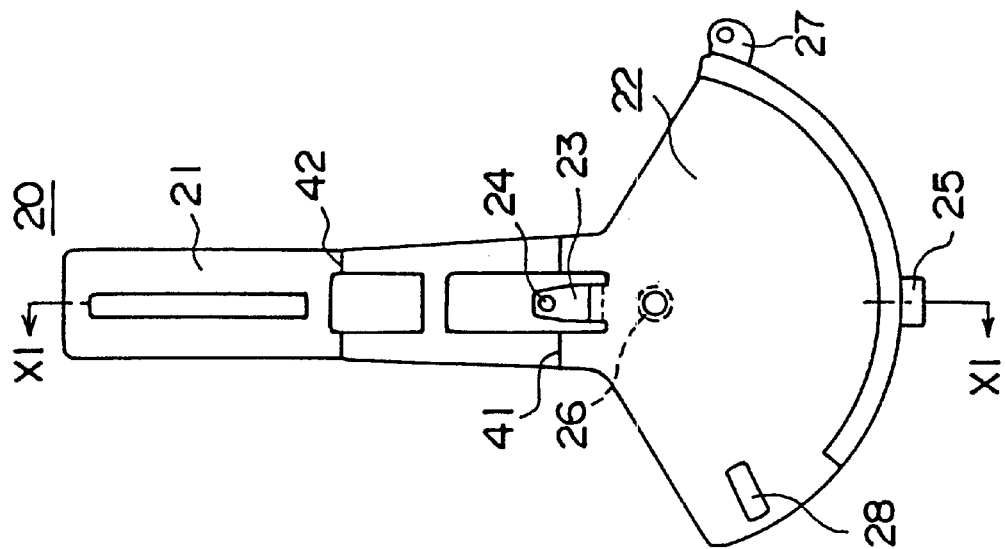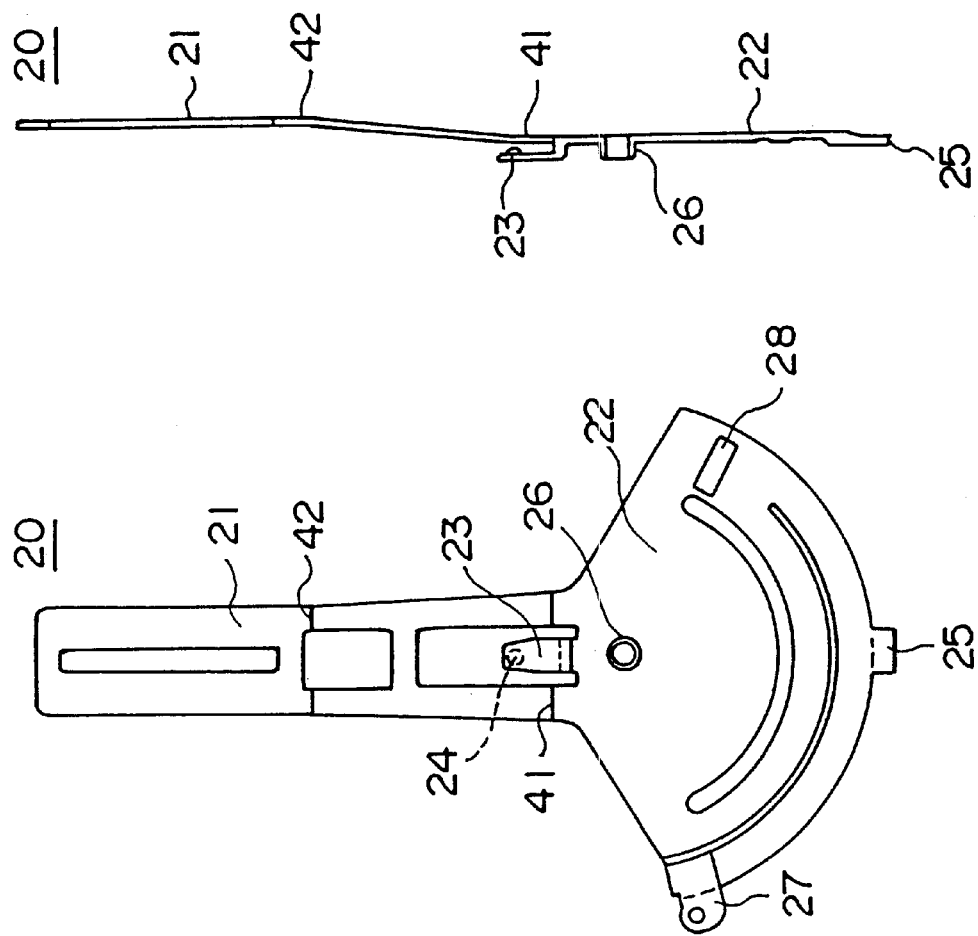

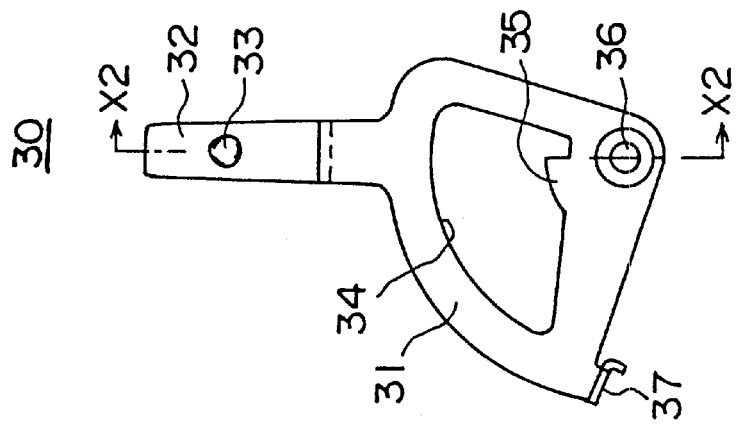
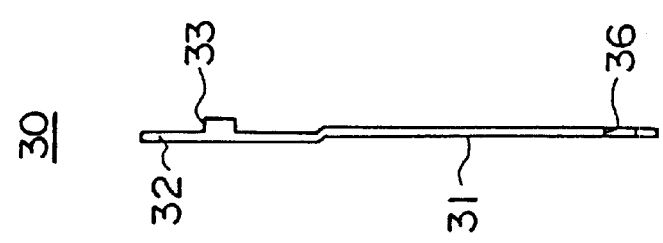
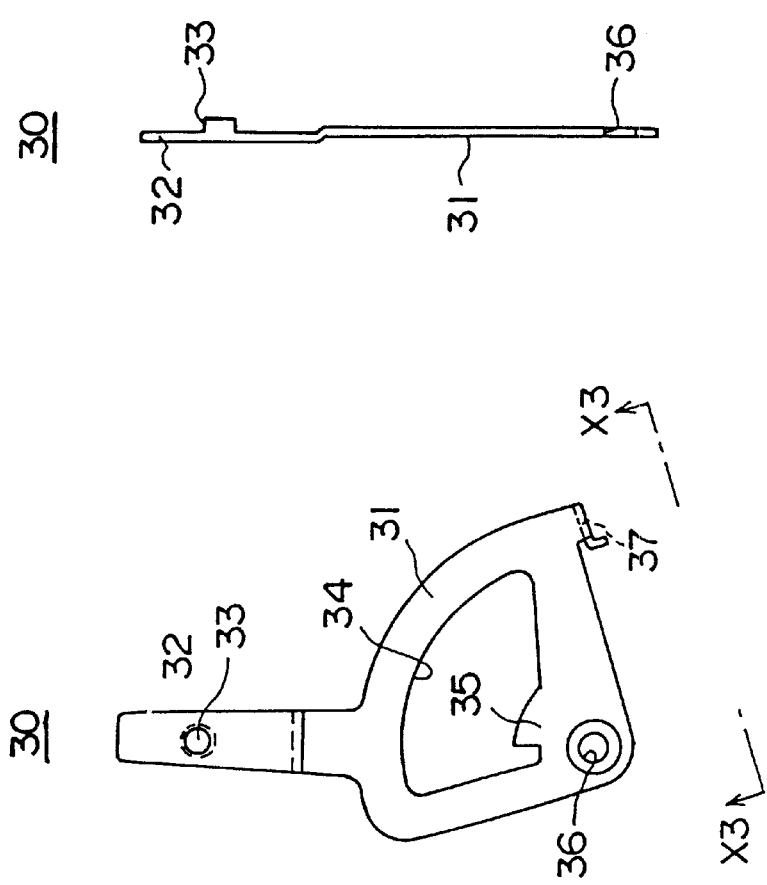
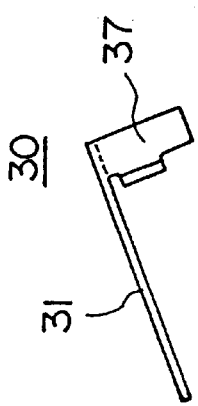

FIG.8
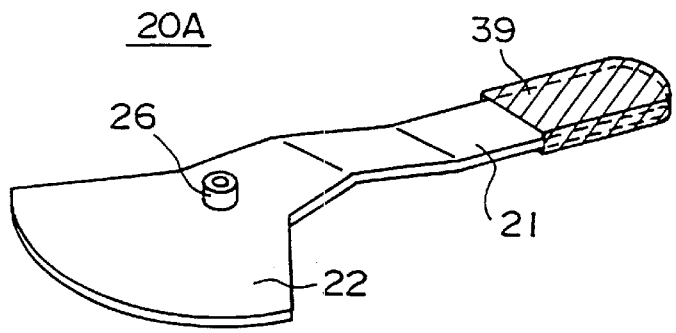
FIG.9A
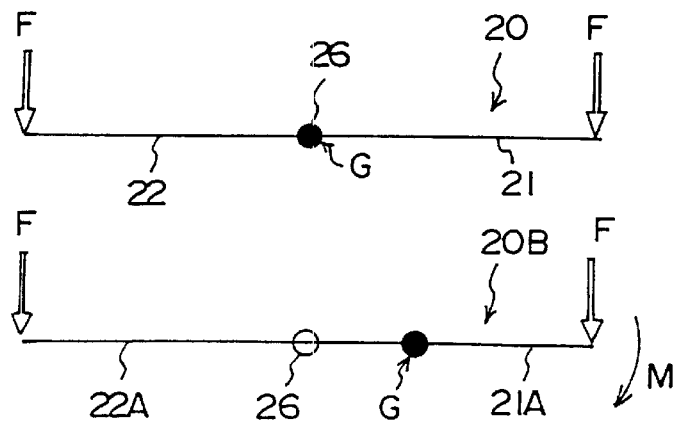
FIG.9B
FIG.10
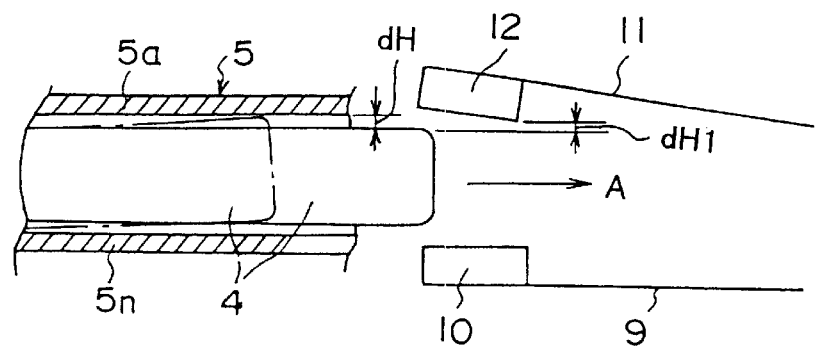

DISK APPARATUS HAVING A SHOCK ABSORBING MEMBER FOR A READ/WRITE HEAD

BACKGROUND OF THE INVENTION (1) Field of the Invention

The present invention relates to a disk apparatus including a read/write head which records information to and/or reproduces information from a disk, the read/write head configured as a pair of upper and lower heads which are brought into contact with front and back surfaces of the disk when the disk is accessed for the recording or the reproduction.

(2) Description of the Related Art

A magnetic disk apparatus, such as a floppy disk drive, is known in which a disk cartridge containing a magnetic disk as a flexible storage medium is loaded into a read/write position, and a read/write head records information to and/or reproduces information from the magnetic disk at the read/write position. In the disk apparatus of this type, the read/write head is configured as a pair of upper and lower heads such that the upper head is brought into contact with the front surface of the disk and the lower head is brought into contact with the back surface of the disk. The recording and/or the reproducing for both the front surface and the back surface of the disk is carried out by the disk apparatus using the read/write head.

A conventional disk apparatus includes a disk loading device which loads the disk cartridge into the read/write position when it is inserted. The disk loading device includes a holder, a slider and a latch lever. The holder holds the disk cartridge when the disk cartridge is inserted. When the disk cartridge is ejected from the disk apparatus, the slider slides in the ejecting direction and moves the holder from the disk-loaded position to the insert/eject position. The latch lever locks the slider when no disk cartridge is inserted. The latch lever is rotated, when the disk cartridge is inserted into the holder, so as to unlock the slider. The holder has laterally extending pins on the side surfaces of the holder, and the slider includes slanted grooves in the side surfaces of the slider. The laterally extending pins of the holder are fitted to the slanted grooves of the slider so that the holder is supported by the slider.

In the conventional disk apparatus, a head carriage to which the upper head and the lower head are attached. The head carriage includes a carriage base and a carriage arm, and the carriage arm is rotatably fitted to the carriage base via a torsion spring. The torsion spring exerts a spring force on the carriage arm so as to force the carriage arm away from the carriage base. The upper head is mounted on the carriage arm, and the lower head is mounted on the carriage base. The carriage arm includes a pair of contact parts laterally extending from the sides of the carriage arm, and the contact parts are brought into contact with the holder.

In the conventional disk apparatus, when the disk cartridge is inserted, the holder, containing the disk cartridge, is moved from the insert/eject position to the disk-loaded position in response to the movement of the slider. The carriage arm of the head carriage is lowered through the contact between the holder and the contact parts of the carriage arm. Hence, when the disk cartridge is loaded to the read/write position, the upper head on the carriage arm is brought into contact with the front surface of the disk, and the lower head on the carriage base is brought into contact with the back surface of the disk.

Conversely, when the disk cartridge is ejected from the conventional disk apparatus, the holder, containing the disk cartridge, is moved from the disk-loaded position to the insert/eject position in response to the movement of the slider. The carriage arm of the head carriage is raised by the spring force of the torsion spring. The upper head is raised from the front surface of the disk by the movement of the holder, and a distance between the upper head and the lower head is kept.

When the above conventional disk apparatus is in the non-access position (or the disk cartridge is not inserted) and the personal computer incorporating the conventional disk apparatus is transported by the user, the upper head and the lower head, movably provided in the conventional disk apparatus, may be harmed or damaged by an external impact force during the transport.

In addition, in the above conventional disk apparatus, a supporting member which supports the upper and lower heads may be deformed or displaced by an external impact force during the transport of the personal computer. In such a case, the upper and lower heads may be hit by each other due to the deformation or displacement of the supporting member, and the upper and lower heads may be harmed or damaged. Further, in the above conventional disk apparatus, a gimbal spring which supports the read/write head may be harmed or deformed by an external impact force during the transport of the personal computer, and a malfunction of the read/write head in the conventional disk apparatus may occur.

Recently, many portable computers, such as notebook-size personal computers, incorporate the floppy disk drive therein. Since such personal computers are frequently transported by the users, and the possibility of the read/write head in the non-access position being harmed or damaged by an external impact force during the transport of the personal computer is increasing. The external impact force acting on the read/write head during the transport of the personal computer will be considerably larger than expected before. For example, it may happen that the personal computer with the conventional disk apparatus incorporated erroneously falls from the user's hands during the transport. If the personal computer erroneously falls from the user's hands during the transport, the upper head and the lower head are hit by each other with a considerably large external impact force, causing a serious damage of the read/write head.

It is desirable that the disk apparatus is provided with a reliable protection mechanism which protects the read/write head from being harmed or damaged. On the other hand, there is a demand for a thin, small-size structure of the disk apparatus for use in such personal computers. However, the conventional disk apparatus is not provided with a reliable protection mechanism for the read/write head, or if, a protection mechanism for the supporting member of the read/write head is provided, such a protection mechanism is inadequate for reliably protecting the read/write head from being harmed by a large impact force. Further, if a protection mechanism for the supporting member of the read/write head is provided, such a protection mechanism in the conventional disk apparatus is not configured in a thin, small-size structure for use in a portable personal computer.

SUMMARY OF THE INVENTION

An object of the present invention is to provide an improved disk apparatus in which the above-described problems are eliminated.

Another object of the present invention is to provide a disk apparatus which reliably keeps the upper and lower heads of the read/write head in the non-access position from being harmed or damaged by an external impact force, while providing a thin, small-size structure for use in a personal computer in which the disk apparatus is incorporated.

Another object of the present invention is to provide a disk apparatus which reliably keeps the upper and lower heads of the read/write head in the non-access position from being harmed or damaged by an external impact force, while providing an increased operability of the disk apparatus.

Another object of the present invention is to provide a disk apparatus which reliably keeps the upper and lower heads of the read/write head in the non-access position from being harmed or damaged by an external impact force, while providing an inexpensive structure for use in a personal computer in which the disk apparatus is incorporated.

The above-mentioned objects of the present invention are achieved by a disk apparatus including: a disk loading device which loads a disk from an insert/eject position to a read/write position, the disk having a first surface and a second surface; a head device which records information to and/or reproduces information from the disk at the read/write position, the head device configured as a pair of upper and lower heads which are brought into contact with the first and second surfaces of the disk when the disk is loaded to the read/write position; and a shock absorbing member which is movably arranged on the disk loading device and has a shock absorbing effect on the upper and lower heads, wherein the shock absorbing member is maintained at an active position between the upper head and the lower head when the disk is at the insert/eject position, and, when the disk is loaded to the read/write position, the shock absorbing member is transferred from the active position into an inactive position where the shock absorbing member does not interfere with the head device.

In a preferred embodiment of the disk apparatus of the invention, when the disk apparatus is in the non-access position and the personal computer incorporating the disk apparatus is transported by the user, the shock absorbing member is placed at the active position between the upper head and the lower head. The upper head and the lower head are not hit by each other if an external impact force occurs during the transport of the personal computer. Both the upper head and the lower head contact the shock absorbing member if the external impact force occurs, and the impact force can be absorbed by the shock absorbing member. Therefore, the disk apparatus of the invention is effective in reliably protecting the upper and lower heads of the head device in the non-access position from being harmed or damaged by the external impact force.

When the disk apparatus is in the access position, the shock absorbing member is transferred from the active position to the inactive position where the shock absorbing member does not interfere with the head device. The disk apparatus of the invention can be configured in a thin, small-size structure. The shock absorbing member can be moved between the active position and the inactive position by utilizing the functions of the existing elements of the disk apparatus. It is not necessary to provide an additional power source, such as a drive motor, which moves the shock absorbing member between the active position and the inactive position. The disk apparatus of the invention provides a thin, small-size structure for use in a personal computer in which the disk apparatus is incorporated.

In a preferred embodiment of the disk apparatus of the invention, the disk loading device includes a holder which holds the disk when the disk is inserted in the holder, the holder having a top surface. The shock absorbing member is made of a resilient sheet material and provided on the top surface of the holder, and the shock absorbing member is resiliently deformed when the disk is inserted into the holder, so that the shock absorbing member is lifted toward the top surface of the holder. The disk apparatus of the invention provides a thin, small-size structure for use in a personal computer in which the disk apparatus is incorporated.

In a preferred embodiment of the disk apparatus of the invention, the shock absorbing member has a shaft and is provided to be rotatable on the top surface of the holder about the shaft, and the shock absorbing member is configured such that the center of gravity of the shock absorbing member lies at the position of the shaft which is the center of the rotation of the shock absorbing member. The disk apparatus of the invention is effective in reliably protecting the upper and lower heads of the head device in the non-access position from being harmed or damaged by a lateral impact force.

In a preferred embodiment of the disk apparatus of the invention, a shock absorbing member moving device transfers the shock absorbing member from the active position into the inactive position when the disk is loaded into the read/write position by the disk loading device, the shock absorbing member moving device having a connecting hook which projects toward the inside of the holder, the shock absorbing member moving device transferring the shock absorbing member into the inactive position through a connection of the connecting hook and the disk when the disk is correctly inserted into the holder. The disk apparatus of the invention provides an inexpensive, thin, small-size structure for use in a personal computer in which the disk apparatus is incorporated.

In a preferred embodiment of the disk apparatus of the invention, the disk loading device includes a holder which holds the disk when the disk is inserted in the holder, the holder having a top surface and a bottom surface. The shock absorbing member is made of a resilient sheet material and provided on the top surface of the holder, and the shock absorbing member has a portion which projects toward the inside of the holder, and, when a disk cartridge containing the disk is inserted into the holder, the disk cartridge is depressed by the portion of the shock absorbing member toward the bottom surface of the holder. The disk apparatus of the invention is effective in reliably protecting the upper and lower heads of the read/write head in the non-access position from being harmed or damaged by an external impact force, while providing an increased operability of the disk apparatus.

BRIEF DESCRIPTION OF THE DRAWINGS

Other objects, features and advantages of the present invention will be more apparent from the following detailed description when read in conjunction with the accompanying drawings in which:

FIG. 4A is a cross-sectional view of the disk apparatus of the present embodiment when the holder is at the insert/eject position;

FIG. 4B is a cross-sectional view of the disk apparatus of the present embodiment when the holder is at the disk-loaded position;

FIG. 6A, FIG. 6B and FIG. 6C are views of the shock absorbing member in the present embodiment;

FIG. 7A, FIG. 7B, FIG. 7C and FIG. 7D are views of the shock absorbing member moving lever in the present embodiment;

FIG. 8 is a perspective view of a variation of the shock absorbing member;

FIG. 9A and FIG. 9B are diagrams for explaining a moment of the shock absorbing member when an impact force is applied; and FIG. 10 is a diagram for explaining an operation of the disk apparatus of the present embodiment when the disk cartridge is inserted.

DETAILED DESCRIPTION OF THE PREFERRED EMBODIMENTS

A description will now be given of the preferred embodiments of the present invention with reference to the accompanying drawings.

Figure 1:
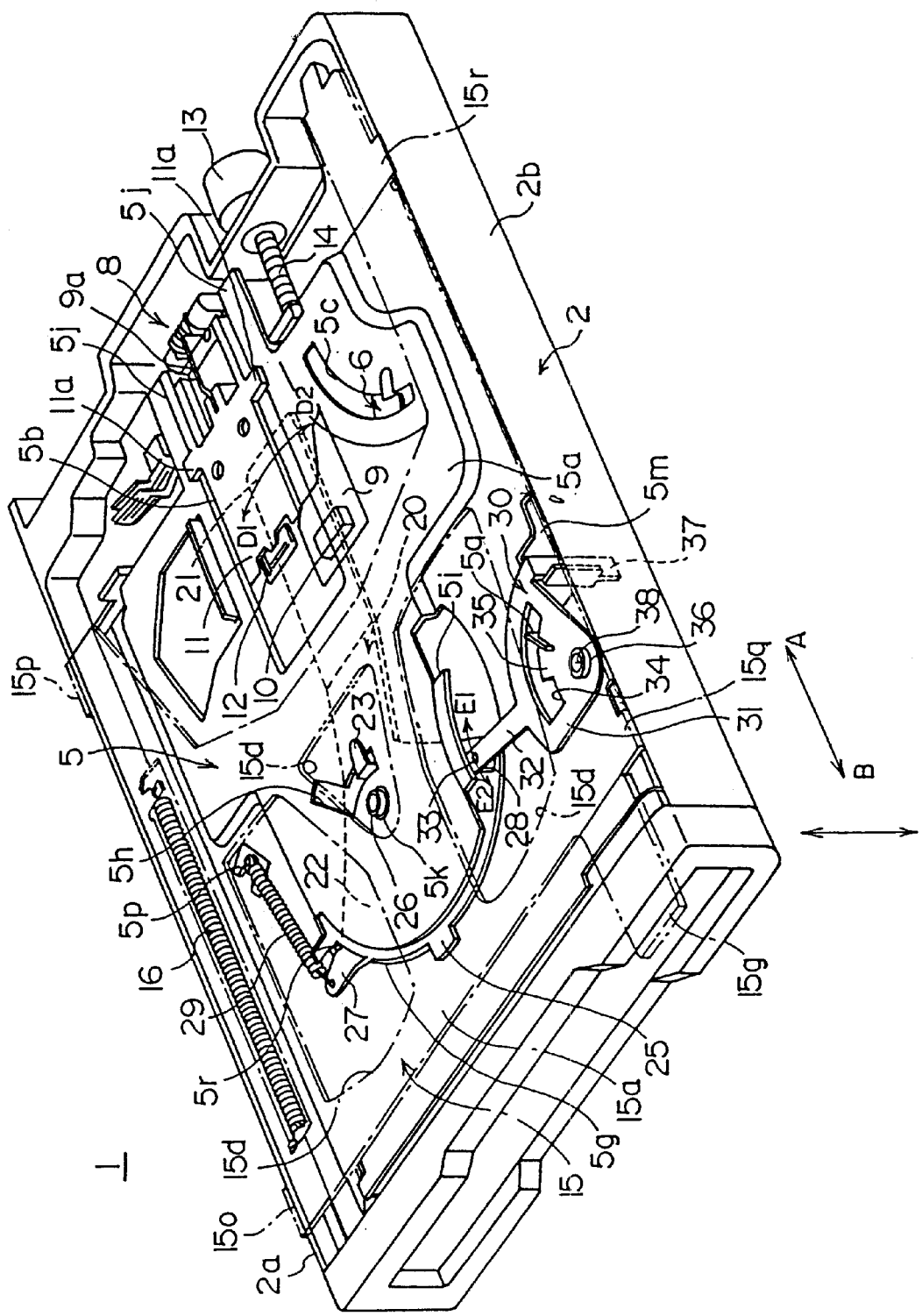
FIG. 1 is a perspective view of an embodiment of the disk apparatus of the invention when a disk cartridge is not inserted.
Figure 2:
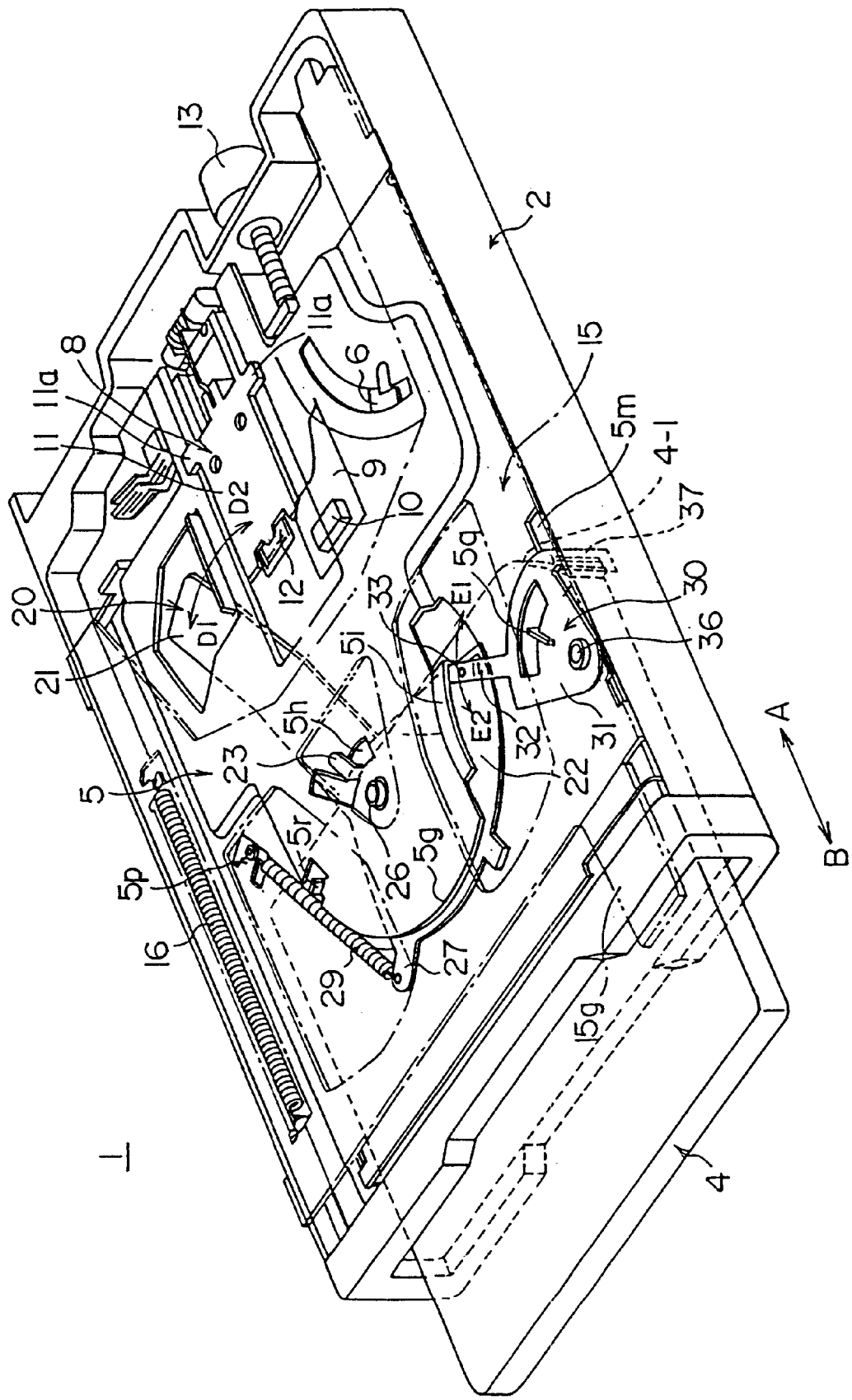
FIG. 2 is a perspective view of the disk apparatus of the present embodiment when a disk cartridge is inserted into a holder.
Figure 3A:
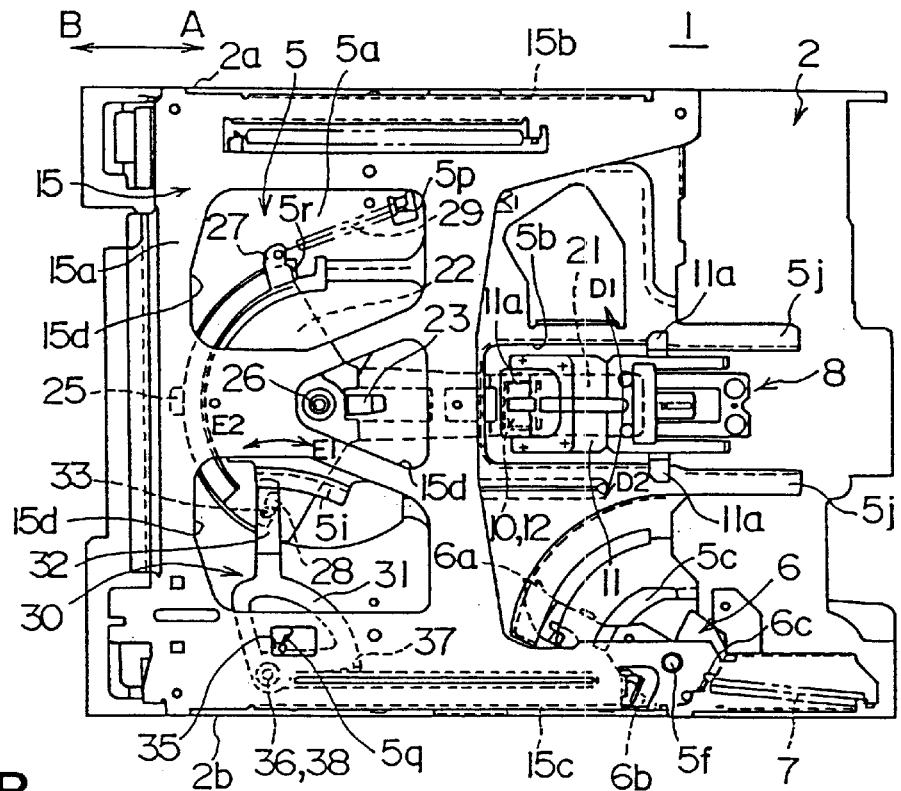
FIG. 3A is a top view of the disk apparatus of the present embodiment when the holder is at an insert/eject position.
Figure 3B:
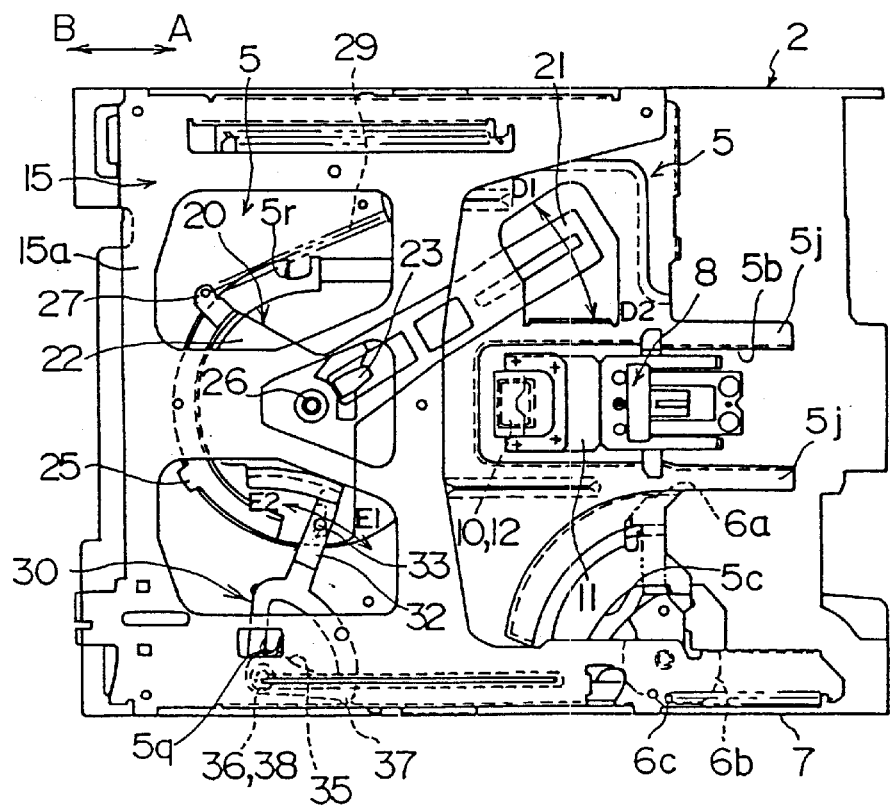
FIG. 3B is a top view of the disk apparatus of the present embodiment when the holder is at a disk-loaded position.

FIG. 1 shows a preferred embodiment of the disk apparatus of the invention when a disk cartridge is not inserted. FIG. 2 shows the disk apparatus 1 of the present embodiment when a disk cartridge 4 is inserted into a holder 5. FIG. 3A is a top view of the disk apparatus 1 when the holder 5 is at an insert/eject position. FIG. 3B is a top view of the disk apparatus 1 when the holder 5 containing the disk cartridge 4 is at a disk-loaded position. FIG. 4A is a cross-sectional view of the disk apparatus 1 when the holder 5 stays at the insert/eject position. FIG. 4B is a cross-sectional view of the disk apparatus 1 when the holder 5 containing the disk cartridge 4 is lowered to the disk-loaded position.

FIG. 3A and FIG. 4A show the disk apparatus 1 in the non-access position wherein the disk is not accessed by the disk apparatus 1, and FIG. 3B and FIG. 4B show the disk apparatus 1 in the access position wherein the disk is accessed by the disk apparatus 1 for the recording and/or the reproducing.

In these figures, the arrow A indicates an insertion direction of the disk cartridge 4 in the disk apparatus 1, the arrow B indicates an ejection direction of the disk cartridge 4 in the disk apparatus 1, the arrow C indicates a vertical "down" direction of the disk apparatus 1, and the arrow D indicates a vertical "up" direction of the disk apparatus 1.

As shown in FIG. 1 through FIG. 4B, the disk apparatus 1 generally has a frame 2, a holder 5, a latch lever 6, a head carriage 8, a slider 15, a shock absorbing member 20 and a shock absorbing member moving lever 30. Hereinafter, the shock absorbing member moving lever 30 will be called the SAM moving lever 30 for the sake of simplicity.

In the present embodiment, the holder 5, the slider 15 and the latch lever 6 constitute a disk loading device in the disk apparatus of the invention. The disk cartridge 4 contains a magnetic disk as a flexible storage medium. When the disk cartridge 4 is inserted into the disk apparatus 1, the disk loading device loads the disk cartridge 4 from an insert/eject position to a read/write position. Specifically, the holder 5 holds the disk cartridge 4 when inserted, and the slider 15 and the latch lever 6 act to load the disk cartridge 4, contained in the holder 5, from the insert/eject position to the read/write position. In the present embodiment, the slider 15 and the latch lever 6 constitute a loading mechanism in the disk apparatus of the invention.

In the disk apparatus 1 of the present embodiment, the holder 5 is provided to be vertically movable between the insert/eject position and the disk-loaded position. When the disk cartridge 4 is inserted, the holder 5 is lowered from the insert/eject position to the disk-loaded position. When the disk cartridge 4 is ejected, the holder 5 is raised from the disk-loaded position to the insert/eject position. The holder 5 includes a top surface 5a, and this top surface 5a includes a rectangular opening 5b in which the head carriage 8 is inserted. The latch lever 6 is pivoted on the top surface 5a of the holder 5. Further, the shock absorbing member 20 is pivoted on the top surface 5a of the holder 5.

The latch lever 6 is rotated in response to the insertion of the disk cartridge 4 such that a shutter 4a of the disk cartridge 4 is opened by the latch lever 6 so as to uncover the disk in an access window (not shown) of the disk cartridge 4. The head device is able to access the disk in the disk cartridge 4 in such a condition. When the disk cartridge 4 is not loaded to the read/write position (or when the disk apparatus 1 is in the non-access position), the latch lever 6 locks the slider 15, or acts to inhibit the movement of the slider 15 in one of the inserting direction A and the ejecting direction B.

The head carriage 8 includes a lower head 10 mounted on a carriage base 9, and an upper head 12 mounted on a carriage arm 11. The lower head 10 and the upper head 12 constitute a head device in the disk apparatus of the invention. When the disk apparatus 1 is in the non-access position, the shock absorbing member 20 is maintained at an active position between the upper head 12 and the lower head 10 to provide the shock absorbing effect on the upper head 12 and the lower head 10. When the disk apparatus 1 is in the access position, the shock absorbing member 20 is transferred from the active position into an inactive position where the shock absorbing member 20 does not interfere with the head device.

The latch lever 6 includes a connecting part 6a at the leading edge of the latch lever 6, and the leading edge of the disk cartridge 4 when inserted is brought into contact with the connecting part 6a of the latch lever 6. The connecting part 6a of the latch lever 6 is connected to the shutter 4a of the disk cartridge 4, and the shutter 4a is opened by the latch lever 6 so as to have the disk in the disk cartridge 4 exposed.

A pin 5f is embedded in the top surface 5a of the holder 5, and the latch lever 6 is pivoted on the pin 5f of the holder top surface 5a. The latch lever 6 includes a cam portion 6b having a circular peripheral surface around the center of the pin 5f. The latch lever 6 includes a hole 6d which is fitted to the pin 5f, and a spring-connecting hole 6c which is located between the hole 6d and the cam portion 6b. When the disk apparatus 1 is in the non-access position without disk cartridge, the cam portion 6b is connected to the slider 15. The latch lever 6 is rotated through the connection of the cam portion 6b and the slider 15 in response to the insertion of the disk cartridge 4 to the holder 5. When the latch lever 6 is rotated, the cam portion 6b is disconnected from the slider 15.

In the disk apparatus 1 of the present embodiment, a coil spring 7 is connected at one end to the spring-connecting hole 6d of the latch lever 6, and connected at the other end to the slider 15. The coil spring 7 exerts an actuating force on the latch lever 6 so as to force the latch lever 6 to be rotated counter-clockwise around the pin 5f as shown in FIG. 3A and FIG. 3B.

The head carriage 8 is movably provided on the frame 2 so that the head carriage 8 can be moved in a radial direction of the disk which is parallel to the insertion and ejection directions A and B. As described above, the head carriage 8 includes the carriage base 9, the lower head 10, the carriage arm 11 and the upper head 12.

In the head carriage 8, the lower head 10 is secured to the carriage base 9, and the upper head 12 is secured to the carriage arm 11 via a gimbal spring 11a. When the disk apparatus 1 is in the access position (with the disk cartridge 4 at the disk-loaded position), the upper head 12 is brought into contact with the front surface of the disk in the disk cartridge 4 and the lower head 10 is brought into contact with the back surface of the disk in the disk cartridge 4.

In the disk apparatus 1 of the present embodiment, a stepping motor 13 and a lead screw 14 are provided so that the lead screw 14 is rotated by the stepping motor 13. The head carriage 8 is engaged with the lead screw 14. In accordance with the rotation of the lead screw 14 by the stepping motor 13, the head carriage 8 is moved on the frame 2 in one of the inserting and ejecting directions A and B through the engagement of the head carriage 8 and the lead screw 14. The direction of the movement of the head carriage 8 on the frame 2 corresponds to a radial direction of the disk of the disk cartridge 4 in the read/write position.

In the head carriage 8, the carriage arm 11 is secured to the carriage base 9 via a leaf spring, and the carriage arm 11 is vertically movable to the carriage base 9 in one of the directions C and D. A torsion spring 9a is connected at one end to a base end of the carriage base 9 and connected at the other end to the carriage arm 11. The torsion spring 9a exerts an actuating force on the carriage arm 11 so as to force the carriage arm 11 to be lowered toward the carriage base 9.

The carriage arm 11 includes a pair of contact parts 11a laterally extending from the sides of the carriage arm 11. The holder 5 includes a pair of rail portions 5j extending from the top surface 5a in the direction A, and the contact parts 11a are brought into contact with the rail portions 5j of the holder 5.

When the disk cartridge 4 is inserted, the holder 5, containing the disk cartridge 4, is lowered from the insert/eject position to the disk-loaded position in response to the movement of the slider 15. The carriage arm 11 of the head carriage 8 is lowered through the contact between the holder 5 and the contact parts 11a of the carriage arm. On the other hand, when the disk cartridge 4 is not inserted (or when the disk apparatus 1 is in the non-access position), the holder 5 is raised to the insert/eject position. The carriage arm 11 in this condition is raised by the holder 5 through the contact between the holder 5 and the contact parts 11a. The upper head 12 is raised from the front surface of the disk, and a distance between the upper head 12 and the lower head 10 is kept.

In the disk apparatus 1 of the present embodiment, the slider 15 is provided on the top surface 5a of the holder 5, and includes a top surface 15a and a pair of side portions 15b and 15c. The slider top surface 15a is brought into contact with the holder top surface 5a. The side portions 15b and 15c are formed by bending the side edges of the slider top surface 15a downward. A plurality of openings 15d are formed in the slider top surface 15a for a reduction of the weight of the slider 15.

In the disk apparatus 1 of the present embodiment, the holder 5 includes a number of laterally extending pins 5d and a pair of laterally extending pins 5e on the side surfaces of the holder 5. In the side portions 15b and 15c of the slider 15, a number of slanted grooves 15e and a pair of guide holes 15f are formed. The laterally extending pins 5d of the holder 5 are fitted to the slanted grooves 15e of the slider 15 so that the holder 5 is supported by the slider 15 and vertically movable between the insert/eject position and the disk-loaded position by the movement of the slider 15. The laterally extending pins 5e of the holder 5 are also fitted to the guide holes 15f of the slider 15, and the connection of the pins 5e and the guide holes 15f act to simply guide the movement of the slider 15 in one of the inserting and ejecting directions A and B.

At the four corners of the top surface 15a of the slider 15, four contact parts 15o, 15p, 15q and 15r are formed, and the contact parts 15o through 15r of the slider 15 are brought into contact with the tops of side surfaces 2a and 2b of the frame 2. A vertical movement of the slider 15 relative to the frame 2 in the down direction C is inhibited by the contact of the contact parts 15o through 15r and the side surfaces 2a and 2b. In the frame 2, a pair of recessed portions (not shown) are formed on the inside of the side surfaces 2a and 2b, and the recessed portions extend in the directions C and D. The laterally extending pins 5e of the holder 5 are fitted to the recessed portions of the frame 2, and the holder 5 is vertical movable between the insert/eject position and the disk-loaded position.

In the disk apparatus 1 of the above-described embodiment, when the slider 15 is moved in the ejecting direction B, the movement of the holder 5 to the frame 2 in one of the directions A and B is inhibited by the connection of the connection of the pins 5e and the recessed portions of the frame 2, and the pins 5d of the holder 5 are moved down along the slanted grooves 15e of the slider 15 by the movement of slider 15. Hence, the holder 5 is lowered from the insert/eject position to the disk-loaded position so that the disk in the disk cartridge 4 held by the holder 5 is loaded to the read/write position.

In the disk apparatus 1 of the present embodiment, the slider 15 includes an eject-button mounting part 15g at a front end portion of the top surface 15a. An eject button is fixed to the eject-button mounting part 15g. When the eject button is pressed by the user in the direction A, the slider 15 is moved in the direction A by the pressing force on the eject-button mounting part 15a. The pins 5d of the holder 5 are moved up along the slanted grooves 15e of the slider 15 by the movement of the slider 15. Hence, the holder 5 is raised from the disk-loaded position to the insert/eject position so that the disk in the disk cartridge 4 held by the holder 5 is moved up to the insert/eject position.

In the disk apparatus 1 of the present embodiment, a compression spring 16 is provided between the holder 5 and the slider 15. The compression spring 16 is connected at one end to the slider 15 and connected at the other end to the top surface 5a of the holder 5. The compression spring 16 exerts an actuating force on the slider 15 so as to push the slider 15 in the direction B. Hence, the slider 15 is always forced to be moved in the direction B by the compression spring 16.

When the disk apparatus 1 is in the non-access position, the slider 15 is locked by the latch lever 6 at a forwarded position away from the front end of the frame 2 in the direction A. The slider 15 in this condition is not moved in the direction B by the actuating force of the compression spring 16. This condition of the disk apparatus 1 is illustrated in FIG. 1, FIG. 3A and FIG. 4A.

When the disk cartridge 4 is inserted into the holder 5, the latch lever 6 is rotated by the disk cartridge 4 so as to unlock the slider 15. Then, the slider 15 in this condition is moved in the direction B by the actuating force of the compression spring 16. As described above, when the slider 15 is moved in the direction B, the disk cartridge 4 is loaded to the read/write position. This condition of the disk apparatus 1 is illustrated in FIG. 2, FIG. 3B and FIG. 4B.

When the disk apparatus 1 is in the access position, the disk in the disk cartridge 4 is placed on a turntable (not shown), the upper head 12 is brought into contact with the front surface of the disk and the lower head 10 is brought into contact with the back surface of the disk. When the disk is rotated on the turntable by a disk motor (not shown), the head device of the disk apparatus 1 records information to and/or reproduces information from the disk.

Figure 5:
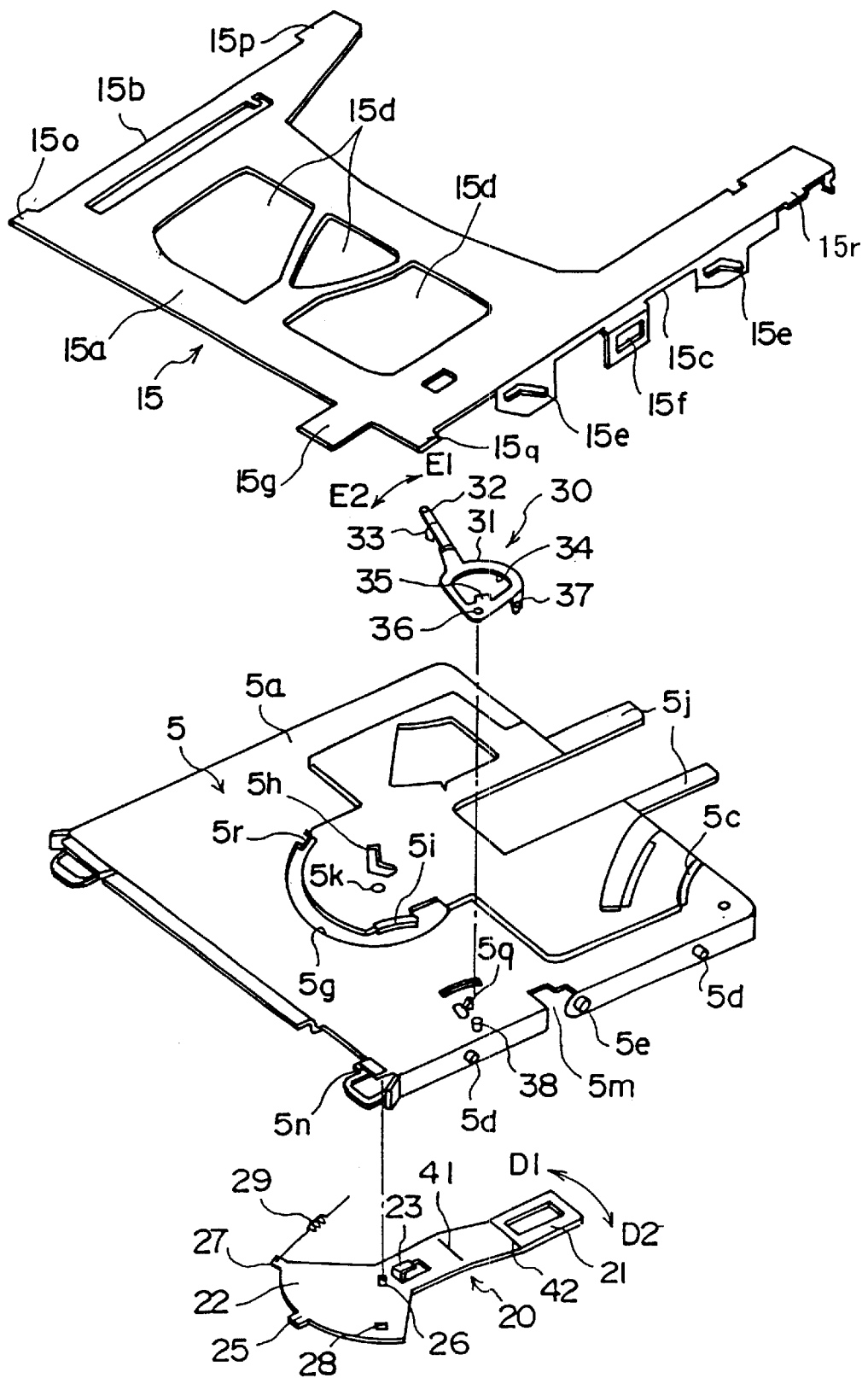
FIG. 5 is an exploded view of the holder, a slider, a shock absorbing member and a shock absorbing member moving lever in the present embodiment.

FIG. 5 is an exploded view of the holder 5, the slider 15, the shock absorbing member 20 and the SAM moving lever 30 in the disk apparatus 1 of the present embodiment.

FIG. 6A is a top view of the shock absorbing member 20 in the present embodiment. FIG. 6C is a bottom view of the shock absorbing member 20. FIG. 6B is a cross-sectional view of the shock absorbing member 20 taken along a line X1—X1 shown in FIG. 6C.

FIG. 7A is a top view of the SAM moving lever 30 in the present embodiment. FIG. 7C is a bottom view of the SAM moving lever 30. FIG. 7B is a cross-sectional view of the SAM moving lever 30 taken along a line X2—X2 shown in FIG. 7C. FIG. 7D is a cross-sectional view of the SAM moving lever 30 taken from a direction of a line X3—X3 shown in FIG. 7A.

The shock absorbing member 20 may be made of a resilient sheet material. A resilient resin material is preferred as the material of the shock absorbing member 20 since the resilient resin material provides a good formability and a light weight of the member 20 with low cost.

As shown in FIG. 5, the shock absorbing member 20 in the present embodiment is mounted on the back of the top surface 5a of the holder 5 such that the shock absorbing member 20 is rotatable on the holder 5 about the center of the rotation.

As shown in FIG. 6A through FIG. 6C, the shock absorbing member 20 generally has a shock absorbing portion 21, a balance-weight portion 22, a first hook 23, a projection 24, a second hook 25, a shaft 26, a spring-connecting part 27, and a connecting hole 28.

The shock absorbing member 20 is rotatable on the holder 5 about the shaft 26 as the center of the rotation, and the shock absorbing portion 21 is arranged in a cantilever formation, longitudinally extending from the shaft 26 as the center of the rotation. As shown in FIG. 4A and FIG. 6B, the shock absorbing portion 21 is slightly bent at two positions 41 and 42 such that one half of the shock absorbing portion 21 is slanted and the other half of the shock absorbing portion 21 is parallel to the top surface 5a of the holder 5. As the shock absorbing member 20 is mounted on the back of the top surface 5a of the holder 5, the shock absorbing portion 21 longitudinally extends to the active position between the upper head 12 and the lower head 10 within the holder 5 and is substantially parallel to the top surface 5a of the holder 5.

The first hook 23 is provided in the shock absorbing portion 21 at a position near the shaft 26. As shown in FIG. 5 and FIG. 6B, the first hook 23 is configured in an L-shaped cross-section such that the base of the first hook 23 is raised from the shock absorbing portion 21 and the flat surface of the first hook 23 extends in parallel to the top surface 5a of the holder 5. The projection 24 is provided on the back of the flat surface of the first hook 23.

As described above, when the disk apparatus 1 is in the non-access position, the shock absorbing member 20 is maintained at the active position between the upper head 12 and the lower head 10 within the holder 5. Although the positions of the lower and upper heads 10 and 12 in the holder 5 with respect to the directions A and B vary depending on the position of the head carriage 8, the shock absorbing portion 21 is configured to have an adequate longitudinal length such that the shock absorbing portion 21 always protects the lower and upper heads 10 and 12 from being harmed or damaged, regardless of whether the head carriage 8 is located near or away from the center of the disk.

In the shock absorbing member 20, the balance-weight portion 22 is formed in a generally-circular-arc configuration, and the second portion 25 is provided almost at the center of the outer periphery of the balance-weight portion 22. As shown in FIG. 6B, the second hook 25 is configured in a step-like cross-section such that the second hook 25 is slightly raised from the balance-weight portion 22.

In the shock absorbing member 20, the spring-connecting part 27 is formed at the left end of the outer periphery of the balance-weight portion 22 as shown in FIG. 6A. A coil spring 29 is connected at one end to the spring-connecting part 27 of the shock absorbing member 20 as shown in FIG. 5. Further, in the shock absorbing member 20, the connecting hole 28 is formed near the right end of the outer periphery of the balance-weight portion 22 as shown in FIG. 6A. The SAM moving lever 30 includes a connecting pin 33, and this connecting pin 33 is fitted to the connecting hole 28 of the shock absorbing member 20, so that the SAM moving lever 30 is connected to the shock absorbing member 20 by the connection of the connecting pin 33 and the connecting hole 28.

The holder 5 has a shaft hole 5k formed in the top surface 5a, and the shaft 26 of the shock absorbing member 20 is fitted to the shaft hole 5k, so that the shock absorbing member 20 is pivoted on the holder 5 by the connection of the shaft 26 and the shaft hole 5k. The holder 5 has an insertion opening 5h and a generally circular opening 5g both formed in the top surface 5a. When the shock absorbing member 20 is mounted on the back of the top surface 5a of the holder 5, the first hook 23 is inserted in the insertion opening 5h and the second hook 25 is inserted in the circular opening 5g.

The shock absorbing member 20 and the holder 5 are connected to each other in the above-mentioned manner. The first hook 23 is brought into contact with the outer periphery of the insertion opening 5h, and the second hook 25 is brought into contact with the outer periphery of the circular opening 5g. If the shock absorbing member 20 is mounted on the back of the top surface 5a of the holder 5, the shock absorbing member 20 is not easily separated from the holder 5. The shock absorbing member 50 is pivoted on the top surface 5a of the holder 5 such that the shock absorbing member 22 is rotatable on the holder 5 about the shaft 26 in one of a direction D1 and a direction D2 both shown in FIG. 5.

The coil spring 29 is connected at one end to the spring-connecting part 27 of the shock absorbing member 20 and connected at the other end to a spring-connecting part 5p of the holder 5. The coil spring 29 exerts an actuating force on the shock absorbing member 20 so as to force the shock absorbing member 20 to be rotated in the direction D2 about the shaft 26.

In the top surface 5a of the holder 5, a stopper 5r is formed at the left end of the outer periphery of the circular opening 5g. The spring-connecting part 27 of the shock absorbing member 20 is initially brought into contact with the stopper 5r, and a further rotation of the shock absorbing member 20 about the shaft 26 beyond the stopper 5r is inhibited by the contact between the spring-connecting part 27 and the stopper 5r. The shock absorbing member 20 is configured such that, when the spring-connecting part 27 contacts the stopper 5r, the shock absorbing portion 21 is maintained at the active position between the upper head 12 and the lower head 10 within the holder 5.

As shown in FIG. 5, the SAM moving lever 30 is mounted on the top surface 5a of the holder 5, and the SAM moving lever 30 is interposed between the slider 15 and the holder 5. As shown in FIG. 7A through FIG. 7D, the SAM moving lever 30 generally has a base portion 31, an arm portion 32, the connecting pin 33, a connecting projection 35, a shaft hole 36, and a connecting hook 37.

In the SAM moving lever 30, the base portion 31 is formed in a generally-circular-arc configuration. The shaft hole 36 is formed at the center about which the circular arc of the base portion 31 is formed. An opening 34 is formed in an inside portion of the base portion 31, and the connecting projection 35 is provided in the opening 34 near the shaft hole 36. The arm portion 32 extends from a given position of the outer periphery of the base portion 31 in a direction away from the shaft hole 36. The connecting pin 33 is formed on the back surface of the SAM moving lever 30 at an intermediate position of the arm portion 32.

As shown in FIG. 7A, in the SAM moving lever 30, the connecting hook 37 is formed at the right end on the outer periphery of the base portion 31. The connecting hook 37 is bent from the outer periphery of the base portion 31 in a direction that is the same as the direction of the connecting pin 33 on the back surface of the SAM moving lever 30.

As shown in FIG. 5, the shaft hole of the SAM moving lever 30 is fitted to a shaft 38 embedded in the top surface 5a of the holder 5 so that the SAM moving lever 30 is pivoted on the holder 5. The SAM moving lever 30 is rotatable on the top surface 5a of the holder 5 about the shaft 38 in one of the directions E1 and E2 as indicated in FIG. 5.

When attaching the SAM moving lever 30 to the holder 5, the connecting pin 33 which is formed in the arm portion 33 of the SAM moving lever 30 is fitted to the connecting hole 28 of the shock absorbing member 20. The shock absorbing member 20 and the SAM moving lever 30 are connected to each other through the connection of the connecting hole 28 and the connecting pin 33.

When attaching the SAM moving lever 30 to the holder 5, the connecting projection 35 which is formed in the opening 34 of the SAM moving lever 30 is fitted to a hook 5q formed on the top surface 5a of the holder 5, and the connecting hook 37 is connected to a cut-out portion 5m of the holder 5. By this connection, the SAM moving lever 30 is not easily detached from the holder 5, and the SAM moving lever 30 is rotatable on the top surface 5a of the holder 5 about the shaft 38 in one of the directions E1 and E2.

As shown in FIG. 5, a step portion 5i is formed in the inner periphery of the circular opening 5g of the holder 5. After the SAM moving lever 30 is mounted on the holder 5, the arm portion 32 of the SAM moving lever 30 is arranged beneath the step portion 5i of the holder 5. By this connection, the lifting of the arm portion 32 from the holder top surface 5a when the SAM moving lever 30 is rotated is prevented.

The connecting hook 37 of the SAM moving lever 30, after it is mounted on the holder 5, is connected to the cut-out portion 5m of the holder 5, and the leading edge of the connecting hook 37 is projecting toward the inside of the holder 5. This connecting hook 37 is arranged in the holder 5 at a position where the projecting part of the connecting hook 37 confronts one of the four corners of the disk cartridge 4 when it is inserted in the holder 5.

Usually, only one of the four corners of the disk cartridge 4 is formed into a correct insertion checking part 4-1 by chamfering the corner. The correct insertion checking part 4-1 of the disk cartridge 4 is shown in FIG. 2. When the disk cartridge 4 is correctly inserted into the holder 5, the correct insertion checking part 4-1 touches the connecting hook 37 of the SAM moving lever 30 which projects toward the inside of the holder 5. The SAM moving lever 30 is slightly rotated about the shaft 38 in the direction E1 by the contact of the part 4-1 and the connecting hook 37, and the insertion of the disk cartridge 4 into the holder 5 is not prevented by the connecting hook 37 of the SAM moving lever 37. On the other hand, when the disk cartridge 4 is incorrectly inserted into the holder 5, another corner of the disk cartridge 4, which is different from the correct insertion checking part 4-1, hits the connecting hook 37 of the SAM moving lever 30. The SAM moving lever 30 is not suitably rotated by a certain interference between the disk cartridge corner and the connecting hook 37. The insertion of the disk cartridge 4 into the holder 5 is prevented by the connecting hook 37 of the SAM moving lever 30.

Accordingly, in the present embodiment, the SAM moving lever 30 acts as an erroneous insertion preventing device which prevents the erroneous insertion of the disk cartridge 4 into the holder 5, as well as acts as a shock absorbing member moving device which moves the shock absorbing member 20 between the active position and the inactive position. It is not necessary that a separate erroneous insertion preventing device, other than the SAM moving lever 30, be provided in the disk apparatus 1. The disk apparatus 1 of the present embodiment is effective in providing an inexpensive, thin and small-size structure for use in a personal computer in which the disk apparatus 1 is incorporated.

In the above-described embodiment, the coil spring 29 and the SAM moving lever 30 constitute the shock absorbing member moving device in the disk apparatus of the invention. The shock absorbing member moving device moves the shock absorbing member between the active position and the inactive position in the disk apparatus of the invention.

Next, a description will be given of operations of the shock absorbing member 20 and the SAM moving lever 30 when the disk apparatus 1 is in the non-access position.

As shown in FIG. 1, FIG. 3A and FIG. 4A, when the disk apparatus 1 is in the non-access position, the disk cartridge 4 is not inserted into the holder 5. The SAM moving lever 30 stays in the initial position shown in FIG. 3A. The shock absorbing member 20 is forced by the coil spring 29 to the active position between the upper head 12 and the lower head 10. The spring-connecting part 27 is brought into contact with the stopper 5r of the holder 5, and a further rotation of the shock absorbing member 20 about the shaft 26 beyond the stopper 5r is inhibited by this connection. The shock absorbing portion 21 of the shock absorbing member 20 is placed at the active position between the upper head 12 and the lower head 10.

Accordingly, when the disk apparatus 1 is in the non-access position and the personal computer incorporating the disk apparatus 1 is transported by the user, the shock absorbing portion 21 is maintained at the active position between the upper head 12 and the lower head 10. The upper head 12 and the lower head 10 are not hit by each other if an external impact force should occur during the transport of the personal computer. Both the upper head 12 and the lower head 10 contact the shock absorbing portion 21 of the shock absorbing member 20 at the active position, and the impact force, if any, can be absorbed by the shock absorbing member 20.

As described above, in the present embodiment, the shock absorbing member 20 is made of a resilient resin material, and the shock absorbing portion 21 is arranged in a cantilever formation, extending from the shaft 26 as the center of the rotation. The shock absorbing portion 21 provides an adequate shock absorbing effect in protecting the upper head 12 and the lower head 10 against damage or deformation even if a large impact force is exerted on the disk apparatus 1 during the transport of the personal computer. The disk apparatus 1 of the present embodiment is effective in reliably protecting the upper and lower heads 12 and 10 in the non-access position from being harmed or damaged by the external impact force, while providing a thin, small-size structure for use in a personal computer in which the disk apparatus 1 is incorporated.

In a case in which the external impact force which may act on the disk apparatus 1 during the transport of the personal computer is larger than expected, the shock absorbing member 20 of the resin material might not reliably provide an adequate shock absorbing effect in protecting the upper and lower heads 12 and 10. To eliminate such a problem, it is conceivable that the shock absorbing portion 21 and the balance weight portion 22 be integrally formed by a metallic material having a higher rigidity than the rigidity of the resin material, and only the part of the shock absorbing portion 21, which will contact the lower and upper heads 10 and 12, be formed by a cushion material. FIG. 8 shows such a variation of the shock absorbing member according to the present invention.

As shown in FIG. 8, a shock absorbing member 20A includes the shock absorbing portion 21 and the balance weight portion 22 which are integrally formed by a metallic material. In the shock absorbing member 20A, only the part of the shock absorbing portion 21 which will contact the lower and upper heads 10 and 12 of the disk apparatus 1 is formed by a cushion material 38. By the change of the material of the shock absorbing member 20 and the addition of the cushion material 39, it is possible that the disk apparatus 1 of the present embodiment reliably protect the upper and lower heads 12 and 10 in the non-access position from being harmed or damaged, even if the external impact force is larger than expected.

In the above-described embodiment, the shock absorbing member 20 is effective in protecting the upper and lower heads 12 and 10 against the external impact force which is applied to the upper and lower heads 12 and 10 in a vertical direction parallel to the "down" and "up" directions C and D of the disk apparatus 1. Generally, however, the direction of the external impact force acting on the heads 10 and 12 during the transport of the personal computer is not always vertical. The external impact force may act on the heads 10 and 12 in a lateral (or horizontal) direction parallel to the top surface 5a of the holder 5 (and perpendicular to the "down" and "up" directions C and D of the disk apparatus 1. Hereinafter, this impact force will be referred to as the lateral impact force.

If the lateral impact force acts on the disk apparatus 1 when it is in the non-access position, the shock absorbing member 20 is forced to be rotated about the shaft 26 by the lateral impact force. If the shock absorbing member 20 is easily rotated about the shaft by the lateral impact force, the shock absorbing member 20 cannot be maintained at the active position between the upper head 12 and the lower head 10. In such a case, the disk apparatus 1 does not reliably protect the upper and lower heads 12 and 10 against damage or deformation.

In order to prevent the above-mentioned rotation of the shock absorbing member 20 by the lateral impact force, the shock absorbing member 20 in the present embodiment is configured such that the center of gravity of the shock absorbing member 20 lies at the shaft 26 which is the center of the rotation of the shock absorbing member 20. By this configuration, the disk apparatus 1 of the present embodiment reliably protects the upper and lower heads 12 and 10 against damage or deformation even when the lateral impact force is applied.

FIG. 9A and FIG. 9B are diagrams for explaining a moment of the shock absorbing member when a lateral impact force F is applied. A description will be given of an operation of the shock absorbing member 20 of the present embodiment when the lateral impact force F is applied.

FIG. 9A shows a moment of the shock absorbing member 20 of the present embodiment when the lateral impact force F is applied. As shown in FIG. 9A, the shock absorbing member 20 is configured such that the center G of gravity of the shock absorbing member 20 lies at the shaft 26 which is the center of the rotation of the shock absorbing member 20.

FIG. 9B shows a moment of another shock absorbing member 20B when the lateral impact force F is applied. As shown in FIG. 9B, the center G of gravity of the shock absorbing member 20B does not accord with the position of the shaft 26 but does deviate from the position of the shaft 26 to the right.

Suppose that the lateral impact force F is applied to both the shock absorbing member 20 of the present embodiment and the shock absorbing member 20B in the same manner as shown in FIG. 9A and FIG. 9B.

In the shock absorbing member 20B of FIG. 9B, the gravity of the shock absorbing member 20B acts on the right deviating position. If the lateral impact force F which is larger than the spring force of the coil spring 29 is applied, the moment M about the shaft 26 in the clockwise direction is produced on the shock absorbing member 20B, and the shock absorbing member 20B is easily rotated about the shaft 26 by the lateral impact force F.

In the shock absorbing member 20 of FIG. 9A, the gravity of the shock absorbing member 20 acts on the position of the shaft 26 which is the center of the rotation of the shock absorbing member 20. If the lateral impact force F is applied, the moment of the impact force F on the end of the shock absorbing portion 21 about the shaft 26 is in equilibrium with the moment of the impact force F on the end of the balance weight portion 22 about the shaft 26. The shock absorbing member 20 of the present embodiment is not easily rotated about the shaft by the lateral impact force F. Therefore, the shock absorbing member 20 is maintained at the active position between the upper head 12 and the lower head 10 even when the lateral impact force F is applied. It is possible for the disk apparatus 1 of the present embodiment to reliably protect the upper and lower heads 12 and 10 against damage or deformation.

By referring to FIG. 2, FIG. 3B and FIG. 4, a description will be given of operations of the shock absorbing member 20 and the SAM moving lever 30 when the disk apparatus 1 is in the access position.

In the following description, suppose only the case in which the disk cartridge 4 is correctly inserted into the holder 5.

In the disk apparatus 1 of the present embodiment, when the disk cartridge 4 is correctly inserted into the holder 5, the correct insertion checking part 4-1 of the disk cartridge 4 touches the connecting hook 37 of the SAM moving lever 30 which projects toward the inside of the holder 5. The SAM moving lever 30 is rotated about the shaft 38 in the direction E1 through the contact of the correct insertion checking part 4-1 and the connecting hook 37. By this rotation of the SAM moving lever 30, the shock absorbing member 20 is rotated about the shaft 26 in the direction D1 through the connection between the connecting pin 33 and the connecting hole 28. The rotation of the shock absorbing member 20 about the shaft 26 is guided by the connection between the first hook 23 and the insertion opening 5h and the connection between the second hook 25 and the circular opening 5g.

In the present embodiment, when the disk cartridge 4 is inserted into the holder 5, the SAM moving lever 30 is rotated from the initial position to a secondary position about the shaft 38 in response to the insertion of the disk cartridge 4 into the holder 5. By this rotation of the SAM moving lever 30, the shock absorbing member 20 is transferred from the active position (FIG. 3A) to the inactive position (FIG. 3B) where the shock absorbing member 20 does not interfere with the upper and lower heads 12 and 10. As shown in FIG. 3B, when the disk cartridge 4 is loaded to the read/write position and accessed by the head device, the shock absorbing member 20 at the inactive position does not interfere with the upper and lower heads 12 and 10.

In the present embodiment, the SAM moving lever 30 is rotated about the shaft 38 in response to the insertion of the disk cartridge 4 into the holder 5, and the shock absorbing member 20 is transferred from the active position to the inactive position by this rotation of the SAM moving lever 30. The shock absorbing member 20 can be moved between the active position and the inactive position by utilizing the functions of the existing elements of the disk apparatus 1. It is not necessary to provide an additional power source, such as a drive motor, which moves the shock absorbing member 20 between the active position and the inactive position. The disk apparatus 1 of the present embodiment is effective in providing an inexpensive, thin and small-size structure for use in a personal computer.

A description will be given of an operation of the shock absorbing member 20 with reference to FIG. 4A and FIG. 4B.

As described above, FIG. 4A shows a condition of the disk apparatus 1 when the holder 5 stays at the insert/eject position, and FIG. 4B shows a condition of the disk apparatus 1 when the holder 5 containing the disk cartridge 4 is lowered to the disk-loaded position.

In the present embodiment, the shock absorbing member 20 is arranged on the back of the top surface 5a of the holder 5, and this arrangement facilitates that the shock absorbing portion 21 be maintained at the active position between the upper head 12 and the lower head 10. As shown in FIG. 4A, the disk apparatus 1 of the present embodiment is effective in providing a thin, small-size structure for use in a personal computer in which the disk apparatus 1 is incorporated. If the shock absorbing member 20 is arranged on another element of the disk apparatus 1, the above advantages of the present embodiment will not be achieved.

As shown in FIG. 4A, in the present embodiment, the shock absorbing portion 21 is slightly bent at the two positions 41 and 42 such that one half of the shock absorbing portion 21 is slanted and the other half of the shock absorbing portion 21 is parallel to the top surface 5a of the holder 5. The shock absorbing portion 21 longitudinally extends to the active position between the upper head 12 and the lower head 10 within the holder 5 and is substantially parallel to the top surface 5a of the holder 5. Further, the shock absorbing member 20 is made of a resilient resin material.

As shown in FIG. 4B, when the disk cartridge 4 is inserted into the holder 5, the shock absorbing member 20 is resiliently deformed by the disk cartridge 4 inserted. As previously described, the shock absorbing member 20 at this time is transferred from the active position (FIG. 3A) to the inactive position (FIG. 3B), and the shock absorbing portion 21 in the shock absorbing member 20 is slightly lifted by the disk cartridge 4 toward the back of the top surface 5a of the holder 5. The shock absorbing member 20 at the inactive position does not interfere with the upper and lower heads 12 and 10. As the shock absorbing member 20 can be placed in a narrow internal space when the disk apparatus 1 is in the access position, the disk apparatus 1 of the present embodiment is effective in providing a thin, small-size structure for use in a personal computer in which the disk apparatus 1 is incorporated.

Further, as shown in FIG. 4A and FIG. 4B, the shock absorbing portion 21 of the shock absorbing member 20 is projecting toward the inside of the holder 5, and, when the disk cartridge 4 is inserted into the holder 5, the disk cartridge 4 is depressed by the shock absorbing portion 21 toward the bottom surface 5n of the holder 5. This arrangement makes it possible to provide an increased operability of the disk apparatus. Specifically, when inserting the disk cartridge 4 with its leading edge upwardly slanted into the holder 5, the above arrangement of the present embodiment can prevent the contact of the leading edge of the disk cartridge 4 with the upper head 12. A description will be given of the above arrangement of the disk apparatus 1 of the present embodiment with reference to FIG. 10.

FIG. 10 shows an operation of the disk apparatus 1 of the present embodiment when the disk cartridge 4 is inserted.

As shown in FIG. 10, the holder 5 is usually configured such that an internal space between the disk cartridge 4 and the back of the top surface 5a of the holder 5 is retained. This internal space of the holder 5 is provided in order to facilitate the insertion of the disk cartridge 4 into the holder 5 and/or the ejection of the disk cartridge 4 from the holder 5. A height of this internal space from the top of the disk cartridge 4 is indicated by the arrow dH in FIG. 10. If no internal space exists between the disk cartridge 4 and the back of the holder top surface 5a, the operator cannot easily perform the insertion of the disk cartridge 4 into the holder 5.

In the present embodiment, the holder 5 is configured such that the internal space (dH) between the disk cartridge 4 and the back of the top surface 5a of the holder 5 is retained. When the operator inserts the disk cartridge 4 with its leading edge upwardly slanted, into the holder 5 as indicated by the one-dot chain line in FIG. 10, the top of the disk cartridge 4 is forced to contact the back of the holder top surface 5a. In such a case, when the leading edge of the disk cartridge 4 inserted passes through the internal space between the upper head 12 and the lower head 10, the distance (indicated by the arrow dh1 in FIG. 10) between the upper head 12 and the top of the disk cartridge 4 becomes considerably small. If no distance exists between the upper head 12 and the top of the disk cartridge 4, the upper head 12 will be harmed or damaged by the disk cartridge 4.

However, in the present embodiment, the shock absorbing portion 21 of the shock absorbing member 20 is projecting toward the inside of the holder 5, and, even when the disk cartridge 4 with its leading edge upwardly slanted is inserted into the holder 5, the disk cartridge 4 is depressed by the shock absorbing portion 21 toward the bottom surface 5n of the holder 5. The internal space (dH) between the disk cartridge 4 and the back of the top surface 5a of the holder 5 is always retained throughout the insertion of the disk cartridge 4. Therefore, the disk apparatus 1 of the present embodiment can prevent the contact of the leading edge of the disk cartridge 4 with the upper head 12. The disk apparatus 1 of the present embodiment is effective in providing an increased operability of the disk apparatus.

In the foregoing description, the present invention is applied to the magnetic disk apparatus as the preferred embodiment. However, the present invention is not limited to the above-described embodiments, and it is applicable to disk apparatuses of other types, such as an optical disk apparatus or a magneto-optical disk apparatus. The present invention is also applicable to a disk apparatus having an automatic disk loading mechanism.

Further, the present invention is not limited to the above-described embodiments, and variations and modifications may be made without departing from the scope of the present invention.

The present invention is based on Japanese priority application No. 10-309,093, filed on Oct. 29, 1998, Japanese priority application No. 10-309,094, filed on Oct. 29, 1998, Japanese priority application No. 10-309,095, filed on Oct. 29, 1998, Japanese priority application No. 10-309,096, filed on Oct. 29, 1998, and Japanese priority application No. 10-309,097, filed on Oct. 29, 1998, the entire contents of which are hereby incorporated by reference.

What is claimed is:

1. A disk device comprising:
   a disk loading device which loads a disk from an insert/eject position to a read/write position, the disk having a first surface and a second surface;
   a head device which records information to and/or reproduces information from the disk at the read/write position, the head device being configured as a pair of upper and lower heads which are brought into contact with the first and second surfaces of the disk when the disk is loaded to the read/write position; and
   a shock absorbing member movably arranged on the disk loading device and having a shock absorbing effect on the upper and lower heads of the head device, wherein the shock absorbing member is maintained at an active position between the upper head and the lower head when the disk is not loaded to the read/write position, the shock absorbing member at the active position directly protecting the upper and lower heads from being harmed or damaged by an external impact force, and, when the disk is loaded to the read/write position, the shock absorbing member is transferred from the active position into an inactive position where the shock absorbing member does not interfere with the head device.

2. The disk apparatus according to claim 1, further comprising a shock absorbing member moving device which moves the shock absorbing member in response to an insertion of the disk into the disk loading device, the shock absorbing member moving device transferring the shock absorbing member from the active position into the inactive position through a connection of the shock absorbing member and the shock absorbing member moving device.

3. The disk apparatus according to claim 1, further comprising a shock absorbing member moving device which transfers the shock absorbing member from the active position into the inactive position when the disk is loaded into the read/write position by the disk loading device.

4. The disk apparatus according to claim 1, wherein the disk loading device includes a holder which holds the disk when the disk is inserted in the holder, and wherein the shock absorbing member is provided on the holder such that the shock absorbing member is movable between the active position and the inactive position.

5. A disk apparatus comprising a disk loading device which loads a disk from an insert/eject position to a read/write position, the disk having a first surface and a second surface;
   a head device which records information to and/or reproduces information from the disk at the read/write position, the head device being configured as a pair of upper and lower heads which are brought into contact with the first and second surfaces of the disk when the disk is loaded to the read/write position; and
   a shock absorbing member movably arranged on the disk loading device and having a shock absorbing effect on the upper and lower heads of the head device, wherein the shock absorbing member is maintained at an active position between the upper head and the lower head when the disk is not loaded to the read/write position, the shock absorbing member at the active position directly protecting the upper and lower heads from being harmed or damaged by an external impact force, and, when the disk is loaded to the read/write position, the shock absorbing member is transferred from the active position into an inactive position where the shock absorbing member does not interfere with the head device wherein the disk device loading device includes a holder which holds the disk when the disk is inserted in the holder, the holder having a top surface, and wherein the shock absorbing member is made of a resilient sheet material and provided on the top surface of the holder, and the shock absorbing member is resiliently deformed when the disk is inserted into the holder, so that the shock absorbing member is lifted toward the top surface of the holder.

6. The disk apparatus according to claim 5, further comprising a shock absorbing member moving device which moves the shock absorbing member in response to an insertion of the disk into the holder, the shock absorbing member moving device transferring the shock absorbing member from the active position into the inactive position through a connection of the shock absorbing member and the shock absorbing member moving device.

7. The disk apparatus according to claim 5, further comprising a shock absorbing member moving device which transfers the shock absorbing member from the active position into the inactive position when the disk is loaded into the read/write position by the disk loading device.

8. A disk apparatus comprising a disk loading device which loads a disk from an insert/eject position to a read/write position, the disk having a first surface and a second surface;
   a head device which records information to and/or reproduces information from the disk at the read/write position, the head device being configured as a pair of upper and lower heads which are brought into contact with the first and second surfaces of the disk when the disk is loaded to the read/write position; and
   a shock absorbing member movably arranged on the disk loading device and having a shock absorbing effect on the upper and lower heads of the head device, wherein the shock absorbing member is maintained at an active position between the upper head and the lower head when the disk is not loaded to the read/write position, the shock absorbing member at the active position directly protecting the upper and lower heads from being harmed or damaged by an external impact force, and, when the disk is loaded to the read/write position, the shock absorbing member is transferred from the active position into an inactive position where the shock absorbing member does not interfere with the head device wherein the disk loading device includes a holder which holds the disk when the disk is inserted in the holder, the holder having a top surface, and wherein the shock absorbing member has a shaft and is provided to be rotatable on the top surface of the holder about the shaft, and the shock absorbing member is configured such that a center of gravity of the shock absorbing member lies at a position of the shaft which is a center of the rotation of the shock absorbing member.

9. A disk apparatus comprising a disk loading device which loads a disk from an insert/eject position to a read/write position, the disk having a first surface and a second surface;

a head device which records information to and/or reproduces information from the disk at the read/write position, the head device being configured as a pair of upper and lower heads which are brought into contact with the first and second surfaces of the disk when the disk is loaded to the read/write position; and a shock absorbing member movably arranged on the disk loading device and having a shock absorbing effect on the upper and lower heads of the head device, wherein the shock absorbing member is maintained at an active position between the upper head and the lower head when the disk is not loaded to the read/write position, the shock absorbing member at the active position directly protecting the upper and lower heads from being harmed or damaged by an external impact force, and, when the disk is loaded to the read/write position, the shock absorbing member is transferred from the active position into an inactive position where the shock absorbing member does not interfere with the head device wherein the disk loading device includes a holder which holds the disk when the disk is inserted in the holder, the holder having a top surface, and said disk apparatus further comprising a shock absorbing member moving device which transfers the shock absorbing member from the active position into the inactive position when the disk is loaded into the read/write position by the disk loading device, the shock absorbing member moving device having a connecting hook which projects toward the inside of the holder, the shock absorbing member moving device transferring the shock absorbing member into the inactive position through a connection of the connecting hook and the disk when the disk is correctly inserted into the holder.

10. A disk apparatus comprising a disk loading device which loads a disk from an insert/eject position to a read/write position, the disk having a first surface and a second surface;

a head device which records information to and/or reproduces information from the disk at the read/write position, the head device being configured as a pair of upper and lower heads which are brought into contact with the first and second surfaces of the disk when the disk is loaded to the read/write position; and a shock absorbing member movably arranged on the disk loading device and having a shock absorbing effect on the upper and lower heads of the head device, wherein the shock absorbing member is maintained at an active position between the upper head and the lower head when the disk is not loaded to the read/write position, the shock absorbing member at the active position directly protecting the upper and lower heads from being harmed or damaged by an external impact force, and, when the disk is loaded to the read/write position, the shock absorbing member is transferred from the active position into an inactive position where the shock absorbing member does not interfere with the head device wherein the disk loading device includes a holder, which holds the disk when the disk is inserted in the holder, the holder having a top surface and a bottom surface, and wherein the shock absorbing member is made of a resilient sheet material and provided on the top surface of the holder, and the shock absorbing member has a portion which projects toward the inside of the holder, and, when a disk cartridge containing the disk is inserted into the holder, the disk cartridge is depressed by the portion of the shock absorbing member toward the bottom surface of the holder.

* * * * *